May 1, 1923.
T. H. MILLER
1,453,802
COMBINED MILK RESERVOIR AND BOWL CLAMP SUPPORT FOR CREAM SEPARATORS
Filed Sept. 29, 1922
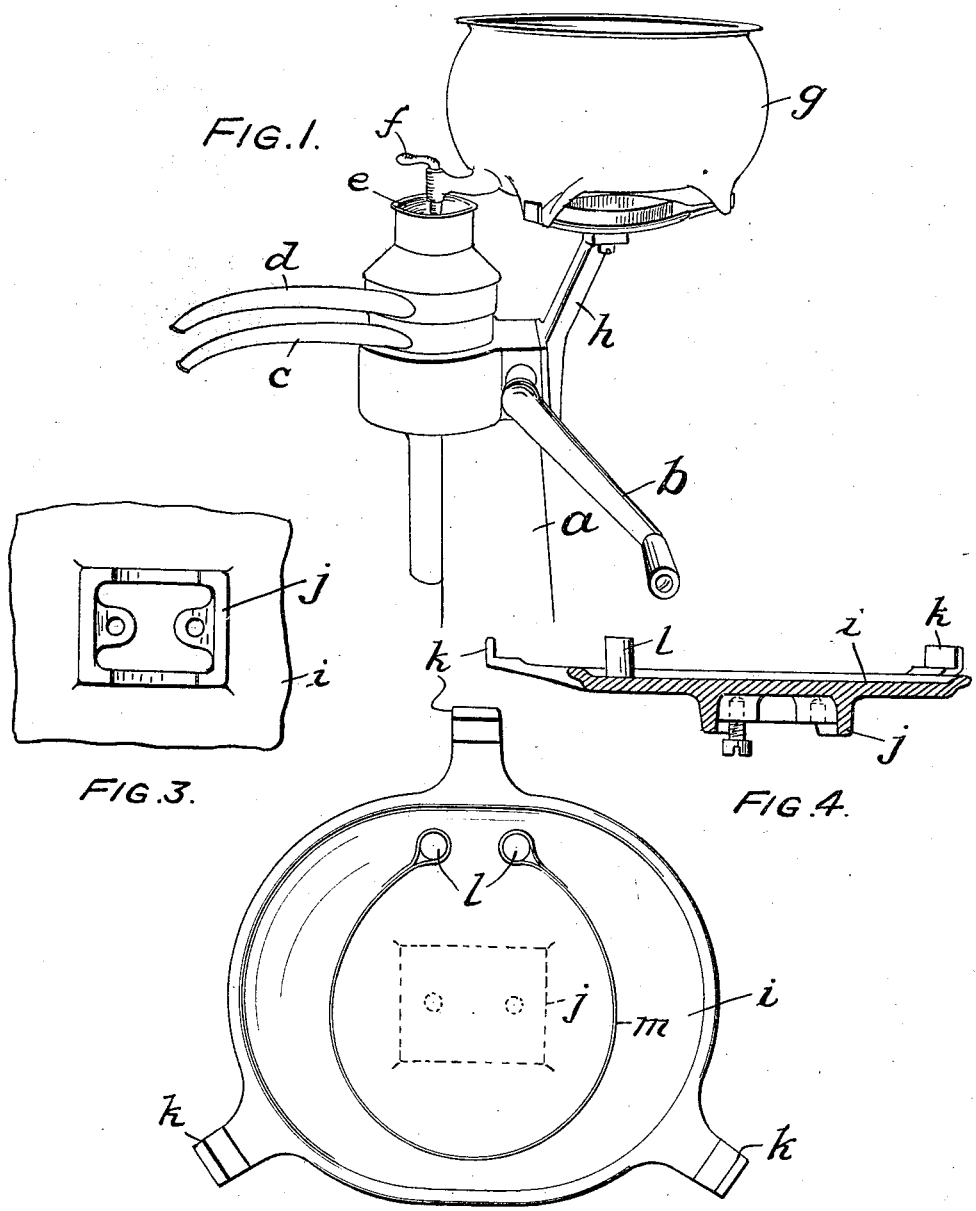
WITNESS:
Rob. R. Kitchel.
INVENTOR
Theodore H. Miller
BY
Frank S. Busser
ATTORNEY.

Patented May 1, 1923.

1,453,802

UNITED STATES PATENT OFFICE.

THEODORE H. MILLER, OF POUGHKEEPSIE, NEW YORK, ASSIGNOR TO THE DE LAVAL SEPARATOR COMPANY, OF NEW YORK, N. Y., A CORPORATION OF NEW JERSEY.

COMBINED MILK RESERVOIR AND BOWL-CLAMP SUPPORT FOR CREAM SEPARATORS.

Application filed September 29, 1922. Serial No. 591,254.

*To all whom it may concern:*

Be it known that I, THEODORE H. MILLER, a citizen of the United States, residing at Poughkeepsie, county of Dutchess, and State of New York, have invented a new and useful Improvement in Combined Milk Reservoirs and Bowl-Clamp Supports for Cream Separators, of which the following is a full, clear, and exact description, reference being had to the accompanying drawings, which form a part of this specification.

This invention relates to an improvement in appurtenances for centrifugal cream separators.

I am aware that a bowl clamp formed of a flexible band having its ends anchored, either mounted on an object remote from the machine or mounted directly on the machine, is old in the art.

Both of these forms of clamps, which were developed in the sequence specified, were distinct advances in the art. In the first step, a perfect, readily appliable and removable clamp was provided whereby the bowl was tightly clamped during the operation of applying or removing the bowl nut. As this clamp was remote from the machine, milk dripped from the bowl when it was carried from the machine to the clamp, while the table or other object to which the clamp was secured was messed by the milk which flowed from the bowl when the bowl was opened.

In the next advance step in the art, the flexible band clamp was located on the separate machine bracket for supporting the milk supply reservoir. By thus positioning the clamp on the reservoir bracket, the clamp was conveniently positioned for the operator and so positioned that the necessity of carrying the bowl from the machine to the clamp (thereby messing the floor of the dairy by drippings from the bowl during such transfer) was obviated, but as no means were provided for catching the flow from the bowl during opening, the machine itself and the floor of the dairy adjacent thereto were messed by milk dripping or flowing from the bowl.

The object of my invention is to provide a separating bowl clamp for holding the bowl when tightening or loosening the bowl nut, which is not only conveniently located for positioning the bowl on the machine and supporting it after removal therefrom, but which is so arranged that all danger of spilling milk on the floor of the dairy or on the machine when opening the bowl for cleaning is avoided.

The object of my invention is accomplished by providing a novel combination bracket for supporting the milk reservoir, having a catch basin or tray which is shaped to properly support the clamping band for holding the bowl, as well as to catch liquid dripping or flowing from the bowl.

The precise nature of my invention will be best understood by reference to the accompanying drawings, which will now be described, it being understood, however, that changes may be made in the details of construction without departing from the spirit and scope of my invention as defined in the appended claims.

Fig. 1 of the drawings is a perspective view of a portion of a centrifugal cream separator with one form of my improved bracket attached thereto.

Fig. 2 is a plan view of the bracket.

Fig. 3 is a bottom plan view of a portion of the bracket showing the securing means therefor.

Fig. 4 is a transverse sectional view through the bracket.

Referring to the drawings: *a* designates the frame or stand of the machine, *b* the operating crank, *c* the skim milk spout and *d* the cream spout. The spouts *c* and *d* are connected to their respective pans, which surround the separating bowl and receive respectively the skim milk and cream discharged from the respective discharge openings of the bowl. The upper or cream pan is provided with a float chamber *e* into which the full milk is delivered through a faucet *f* from a reservoir *g*. The reservoir *g* is supported by my improved combined bracket, which in turn is supported from the frame *a* of the machine by a bracket or arm *h*.

In the form shown in the drawings, my improved bracket comprises a tray *i*, which is of elliptical form having a recessed projection *j* on the bottom thereof for the reception of the arm *h*, to which it is secured by means of two screws.

Extending radially and upwardly from the tray *i* are three milk reservoir supporting arms *k*, having at the ends thereof upwardly extending flanges adapted to position the reservoir on the supporting arms.

Extending upward from the floor of the tray $i$ are two cylindrical studs $l$ for the reception of the looped ends of a flexible metallic bowl clamping band $m$. These studs are so positioned that when the band is in normal position its center will very nearly coincide with the center of the tray.

By making the tray of substantially elliptical shape and positioning the studs $l$ on opposite sides of the shorter diameter of the tray near the rim, sufficient area is provided to allow the bowl to swing laterally, in either direction, along the longer diameter of the tray during the operation of removing or applying the bowl nut and to support the bowl, in any position; while the length of the shorter diameter of the bowl is so limited as to create no obstruction to the easy removal of the pans and the removal of the bowl from the spindle.

The floor of the tray is substantially flat so as to form a proper support for the band and bowl when they are shifted laterally on the tray during tightening or loosening.

The feet of the reservoir and the arms on the bracket for supporting the reservoir are so shaped that the clamp band may always remain in clamping position when the reservoir is in position to deliver milk to the machine.

After the milk has been separated, the reservoir $g$ as well as the skim milk and cream pans are removed for cleaning. After the pans are removed, the separating bowl will be exposed for removal from the machine, and after the operator removes it from its spindle he immediately places it on the tray, within the band. As the tray is adjacent to the spindle of the machine, the bowl can be readily transferred from one to the other without dripping milk onto the machine. Any milk dripping from the exterior of the bowl while in the clamp or which flows from the bowl during the opening thereof will be caught by the tray, so that the various parts of the bowl may be separated for cleaning while the bowl body is supported on the tray without danger of befouling the machine or floor of the dairy adjacent to the machine during the opening of the bowl. After the bowl parts have been removed from the tray, the band may be readily removed and cleaned and the tray can then be cleaned for the reception of the cleaned band and bowl parts.

Having now fully described my invention, what I claim and desire to protect by Letters Patent is:

1. In a cream separator, a combined full milk reservoir support, bowl clamp and milk catching device, comprising the combination with the separator bracket, of supporting means for the reservoir carried thereby, a liquid catching tray within and in rigid and permanent relation with the reservoir supporting means, and a pair of studs projecting upward from the floor of the tray for anchoring the ends of a clamping band, whereby when the reservoir is removed and the bowl is placed on the tray within the band and the bowl top removed the liquid flowing from the bowl will be caught on the tray.

2. A bracket for a cream separator having an elliptical-shaped tray with an upstanding rim and radially disposed reservoir supporting arms extending therefrom, and a pair of bowl clamping band anchoring studs extending upward from the floor of the tray and positioned near the rim on opposite sides of the shorter diameter of the tray.

In testimony of which invention, have hereunto set hand, at Poughkeepsie, N. Y., on this 23 day of September, 1922.

THEODORE H. MILLER.